United States Patent
Davis et al.

[15] 3,635,275
[45] Jan. 18, 1972

[54] TRACTOR TIRE VALVE ASSEMBLY

[72] Inventors: Melvin Lee Davis, Stony Creek, Va. 23882; Ray L. Cutchins, 305 N. Church St., Lake City, S.C. 29560

[22] Filed: Dec. 15, 1969

[21] Appl. No.: 885,106

[52] U.S. Cl. ........................................152/429, 152/DIG. 5
[51] Int. Cl. .................................................B60c 29/00
[58] Field of Search..................152/330, DIG. 5, 427, 429

[56] References Cited

UNITED STATES PATENTS 2,222,047   11/1940   Snyder..............................152/DIG. 5
2,400,969   5/1946   Baker................................152/DIG. 5

*Primary Examiner*—Drayton E. Hoffman
*Attorney*—Mason, Fenwick & Lawrence

[57] ABSTRACT

A tractor tire valve assembly to facilitate withdrawal and return of liquid from or to the tire, including a tubular sleeve forming a housing collar, a valve core carrier threaded into the bore of the sleeve, and a valve core unit supported in the carrier. The sleeve has an externally threaded outer end sized to be intercoupled with a standard hose coupling and the diameter of the bore in the sleeve approximates that of a standard hose.

2 Claims, 3 Drawing Figures

PATENTED JAN 18 1972 3,635,275

INVENTORS
MELVIN LEE DAVIS &
RAY L. CUTCHINS

BY Mason, Fenwick & Lawrence
ATTORNEYS

TRACTOR TIRE VALVE ASSEMBLY

BACKGROUND AND OBJECTS OF THE INVENTION

Heretofore, the valves customarily used in the rear tires of tractors such as wheeled tractors used for agricultural purposes, have usually included a main valve collar or sleeve, forming a tubular housing projecting through the wheel rim and having an internally threaded bore for a valve core unit. The valve core unit and the internally threaded bore therefor have usually been about three-sixteenths inch in diameter. It is common for the tractor owner to keep the tractor tires filled with an antifreeze and water mixture, or other liquid solution of low freezing point, to provide greater traction. Naturally, this liquid must be first removed from the tire before any repairs can be made to the tire or innertube, and tractor owners usually leave this time consuming operation to the tire repair people. Further, if the liquid fill in the tire includes antifreeze or some low freezing temperature solution, the tractor owner usually insists on the tire repair establishment preserving this solution so that it can be used to refill the tire after the repair is completed. While commercial tire repair people have removed the core unit from the valves and resorted to special pumps to expedite removal of this liquid fill from tires delivered to them for repair, 3½ to 4 hours are ordinarily required to remove the fill liquid and a corresponding period to refill the tire after it has been repaired.

An object of the present invention is the provision of a novel valve construction for tractor tires having a conventional core supported in a removable carrier, wherein removal of the core unit and carrier leaves a larger cross section opening for rapid emptying of liquid from the tire or refilling of the tire.

Another object of the present invention is the provision of a novel tractor tire valve construction as described in the preceding paragraph, wherein the core unit carrier is threaded in a bore of a tubular sleeve or housing collar having an annular externally threaded outer end portion sized to fit a standard water hose coupling to facilitate connecting the valve to a drain hose or a pump unit for liquid withdrawal from the tire by tire repair services or by the tractor owner.

Other objects, advantages and capabilities of the present invention will become apparent from the following detail description, taken in conjunction with the accompanying drawings, illustrating a preferred embodiment of the invention.

DETAIL DESCRIPTION OF A PREFERRED EMBODIMENT

Figure 1:
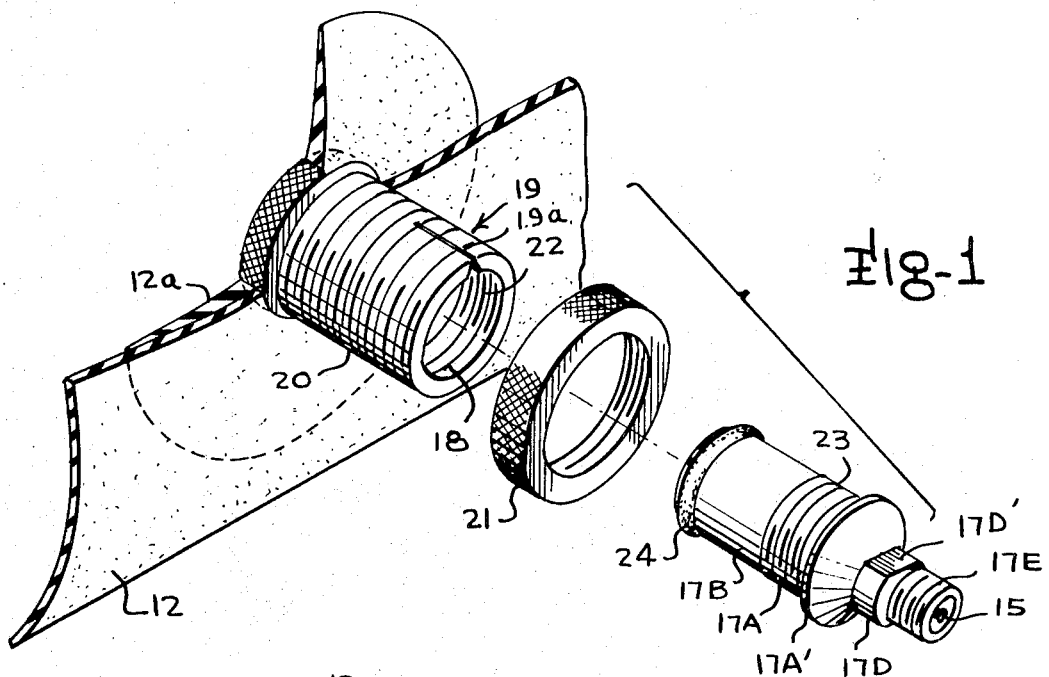
FIG. 1 is a fragmentary exploded perspective view of a tractor tire including a valve constructed in accordance with the present invention.
Figure 2:
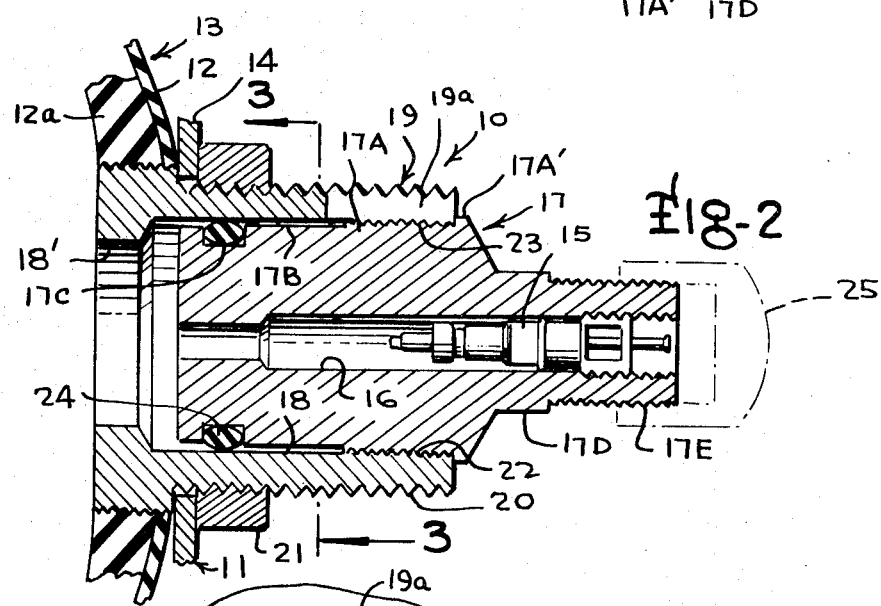
FIG. 2 is a longitudinal section view of the valve construction.
Figure 3:
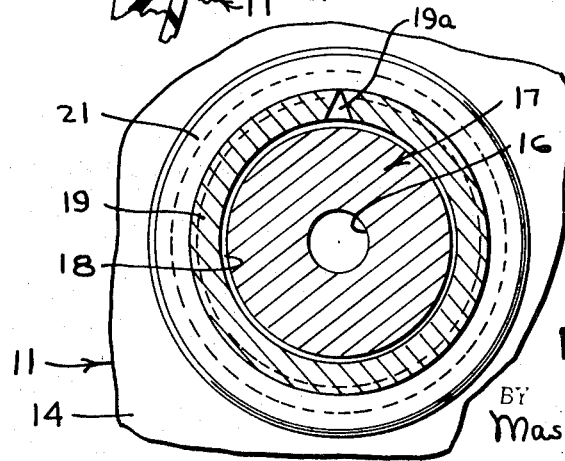
FIG. 3 is a transverse section view, taken along the line 3—3 of FIG. 2.

Referring to the drawing, wherein like reference characters designate corresponding parts throughout the several figures, the tractor tire valve assembly of the present invention is indicated generally by the referenced character 10 and is illustrated in FIG. 2 in installed condition on a tractor wheel 11, the valve assembly being associated in the usual fashion with the innertube 12 of a rear tractor tire 13 and projecting through the rim of the wheel as illustrated. The tire valve assembly 10 includes a conventional tractor tire valve core unit 15, for example a three-sixteenths inch, 36 T.P.I. valve core of the type made by the Schrader Company, which is removably seated in the bore 16 extending axially through the center of a valve core carrier or adapter 17, which in turn is removably threaded in the bore 18 of an outer tubular sleeve or housing collar 19. The outer sleeve or collar 19 is bonded at its inner end to the innertube, or to a disc of rubber or similar material 12a inwardly abutting the innertube, and extends through a suitable aperture in the wheel hub 14. The sleeve or housing collar 19 is externally threaded as indicated at 20, for example with 14 threads per inch, for threading of a retainer nut 21 thereon to fix the sleeve or collar 19 in proper projecting relation relative to wheel hub 14 and has an air bleedoff groove 19a of sufficient axial length at its outer end to bleed off air when in the process of filling the tire with water or other liquid.

As illustrated in the drawings, the outer end portion of the bore 18 in the sleeve 19 is internally threaded, as indicated at 22 to cooperate with the threads 23 on an enlarged diameter portion 17A of the carrier 17 for removable seating of the carrier 17 in the bore 18. An elongated smaller diameter portion 17B of the carrier 17 projects towards the inner end of the bore 18 in the sleeve 19, and near its inner end has a circumferential groove 17C supporting a sealing ring 24 of resilient material which is compressed against the interior surface of the bore 18 to seal the space between the confronting surfaces of the carrier 17 and bore 18 against leakage of air therethrough. The larger diameter portion 17A terminates outwardly in a slightly enlarged head 17A', the outer surface of which flares inwardly in a conical path and joins an outer constricted cylindrical section 17D which then joins an externally threaded end portion 17E onto which a conventional valve cap, as indicated in broken lines 25 may be fitted.

As an illustrative example, the sleeve or collar 19 may have an outer diameter of about 1.020 inch and inner diameter of about 0.765 inch in the region of the threads 20 and 22, the threads 22 may be 28 threads per inch (T.P.I.) extending axially for about one-half inch, and the bore 18 having a constricted portion 18' adjacent its innermost end. The valve core carrier or adapter 17 may have a 3/16-inch-diameter bore over its major length opening through the outer end thereof, to receive the correspondingly sized valve core unit 15, the threaded larger diameter portion 17A of the carrier may have a diameter of about 0.780 inch and an axial length of about three-eighths inch with 28 threads per inch. The distance from the transition between the carrier portions 17A and 17B to the adjacent edge of the groove housing the sealing ring 24 may be about five-sixteenths inch and have a diameter of about 0.739 inch, the sealing ring groove may have an axial width of about one-eighth inch, and the inner end portion of the carrier section 17B between the sealing ring groove and the inner end may be about one-sixteenth inch in axial length and have a diameter of 0.731 inch. The distance from the inwardly facing edge of the head 17A' to the outer end of the cylindrical section 17D may be about five-sixteenths inch, with the diameter of the section 17D being about 0.480 inch, and the threaded end portion 17E may have an axial length of about seven-sixteenths inch. To facilitate removal of the carrier, the section 17D may have diametrically opposite flats, as indicated at 17D'.

It will be appreciated that with the present construction, when the tractor tire having the valve assembly 10 therein is in need of repair, the valve core unit 15 and the carrier or adapter 17 therefor can be removed as a unit by unthreading the latter from the threaded bore 18, thus leaving a large diameter bore through which the antifreeze and water mixture or other filling solution in the tire can be rapidly withdrawn, the opening being about three-fourths inch in diameter. The external diameter of the sleeve 19 and the pitch of the threads 20 thereon are such as to permit the sleeve 19 to be coupled to a standard water hose, having 14 threads per inch, such as is provided on conventional pumps, so that the fluid can be withdrawn from the tire in about 15 minutes. Also, because the sleeve is sized to be coupled to a standard hose coupling, the farmer or owner of the tractor can connect a hose to the valve and withdraw the fluid, or at least most of the fluid, from the tire before taking the tire to the repair establishment, thereby saving the tire repair business from the substantial loss of time that was otherwise consumed in the long fluid withdrawing procedure previously required.

What is claimed is:

1. A tractor tire valve assembly for inflatable tractor tires of the type frequently having substantial quantities of liquid in the interior inflation chamber of the tire to increase traction during use, the valve assembly comprising an outer tubular sleeve member forming a housing collar adapted to extend outwardly through the rim of a wheel and including an externally threaded outer end portion having an outer diameter of about 1 inch sized to be threadedly intercoupled with a standard threaded hose coupling, said sleeve member having a bore therethrough internally threaded at its outer end and extending from an inner end of the sleeve member in communication with said inflation chamber, said bore having a diameter of about three-fourths inch over the outer major axial portion thereof, a valve core carrier member of annular cross section removably supported in said bore having a cylindrical body portion sized to tightly fit in said bore and a center passage therethrough paralleling the axis of said bore for removably supporting a valve core unit, said carrier member having external threads on said body portion to interfit with the threads of said internally threaded bore, said core carrier member having a radially outwardly opening circumferential groove spaced inwardly toward the inflation chamber from the external threads on said body portion and a resiliently deformable sealing ring in said groove bearing in sealing member to form a seal against escape of air between said carrier member and sleeve member, and said sleeve member having an air bleedoff groove extending through the wall thereof inwardly from the outer end thereof in parallelism with the axis of said bore for a sufficient distance inwardly of the innermost location of a hose coupling threaded onto the sleeve member to provide a passage for bleedoff of air from within the inflation chamber during introduction of the liquid into the inflation chamber, the innermost end of said bleedoff groove being spaced toward said outer end from said sealing ring when said carrier member occupies its normal assembled position in said bore.

2. A tractor tire valve assembly as defined in claim 1, wherein said body portion of said carrier member includes an enlarged diameter head portion located immediately outwardly along the body portion adjacent the external threads thereon, said head portion having a greater maximum diameter than said bore and defining an annular shoulder surface to abut the outer end of said sleeve member.

* * * * *